United States Patent [19]

Kohno et al.

[11] Patent Number: 5,094,512
[45] Date of Patent: Mar. 10, 1992

[54] FLOW CONTROL VALVE FOR AN ANTILOCKING DEVICE IN A VEHICLE BRAKE SYSTEM

[75] Inventors: Teruhisa Kohno; Koichi Hashida, both of Hyogo, Japan

[73] Assignee: Sumitomo Electric Industries, Ltd., Osaka, Japan

[21] Appl. No.: 535,778

[22] Filed: Jun. 8, 1990

[30] Foreign Application Priority Data

Jun. 9, 1989 [JP] Japan .................................. 1-147085

[51] Int. Cl.⁵ .......................... B60T 8/42; B60T 8/50
[52] U.S. Cl. .............................. 303/117; 303/115 PP; 303/116 R; 303/119 R
[58] Field of Search ............... 303/84.1, 84.2, 113, 303/115, 117, 119, 40, 115 PP, DIG. 5, DIG. 6, 116 R, 119 R

[56] References Cited

U.S. PATENT DOCUMENTS

| | | | |
|---|---|---|---|
| 3,443,594 | 5/1969 | Frayer | 303/40 X |
| 3,856,047 | 12/1974 | Takayama . | |
| 4,099,792 | 7/1978 | Schmid et al. | 303/117 X |
| 4,120,540 | 10/1978 | Derlieg | 303/117 |
| 4,640,558 | 2/1987 | Nomura et al. | 303/119 |
| 4,715,666 | 12/1987 | Farr | 303/117 X |
| 4,779,934 | 10/1988 | Ando | 303/117 X |
| 4,892,362 | 1/1990 | Takata | 303/117 X |
| 4,915,459 | 4/1990 | Hashida et al. | 303/117 X |

FOREIGN PATENT DOCUMENTS

| | | |
|---|---|---|
| 0297797 | 1/1989 | European Pat. Off. . |
| 49/28307 | 7/1974 | Japan . |
| 80/01783 | 9/1980 | United Kingdom . |
| 2161231 | 1/1986 | United Kingdom . |

*Primary Examiner*—Douglas C. Butler
*Assistant Examiner*—Peter M. Poon
*Attorney, Agent, or Firm*—W. G. Fasse; D. H. Kane, Jr.

[57] ABSTRACT

A flow control valve for an antilocking device in a vehicle brake system prevents a locking of the wheels during a brake application. The flow control valve includes a pressure reducing chamber (115) regularly connected with an outlet port (111) through a passage by way of a fixed orifice (125). An inlet port (110) is normally connected with the outlet port (111) through a small passage. Therefore, even if a spool (116) is fixed in a position closing a large passage, working fluid introduced into the inlet port (110) flows to the outlet port (111) through the small passage, whereby it is possible to apply pressure to a wheel brake without wheel locking.

5 Claims, 11 Drawing Sheets

FLOW CONTROL VALVE FOR AN ANTILOCKING DEVICE IN A VEHICLE BRAKE SYSTEM

FIELD OF THE INVENTION

The present invention relates to a flow control valve which is employed as an antilocking device for preventing the locking of the wheels by applying the brake in a brake system of a vehicle.

BACKGROUND INFORMATION

An antilocking device for a vehicle brake system is disclosed in Japanese Patent Publication No. 28307/1974, for example, wherein two electromagnetic valves are provided for one wheel so that fluid pressure for a wheel brake is controlled in three modes of pressure application, holding and pressure reduction by controlling the operations of the two electromagnetic valves. Such an antilocking device for a vehicle for a vehicle brake system has recently come into wide use, and it is necessary to reduce the size and cost of such a device. In place of the antilocking device disclosed in the above mentioned Japanese Patent Publication, it is possible to provide a single electromagnetic valve for each wheel and to control the fluid pressure for the wheel brake in two modes of pressure application and pressure reduction by controlling the operation of the electromagnetic valve.

In other words, an antilocking device could be provided with a three-port two-position control valve having three ports which are connected to a pressure source, a wheel brake and a reservoir respectively. Such a antilocking device is so structured that the port which is connected to the pressure source communicates with the port which is connected to the wheel brake when no power is supplied to the three-port two-position control valve while the port which is connected to the wheel brake communicates with the port which is connected to the reservoir when power is supplied to the three-port two-position control valve. When the three-port two-position control valve is not supplied with power, a normal braking operation through a brake pedal and re-pressurization for an antilocking control are implemented. When the three-port two-position control valve is supplied with power, on the other hand, a pressure reduction for antilocking control is implemented.

However, the antilocking device comprising the aforementioned three-port two-position control valve has the following problem: The rate of re-pressurization for the antilocking control must be reduced to assure the necessary controllability. However, when the rate of re-pressurization is reduced by a generally used throttle device, the rate of pressure application in the normal braking operation is also reduced in addition to the rate of re-pressurization for the antilocking control. Thus, it is difficult to achieve an optimal brake application by merely controlling the operation of the three-port two-position control valve.

A control valve employed for an antilocking device must be capable of ensuring a high pressure application rate in a normal braking operation and implementing a small re-pressurization rate in a re-pressurization for the antilocking control. British Patent Publication No. GB8512610 corresponding to U.S. Pat. No. 4,715,666 (Farr) discloses a flow control valve which implements such operations.

Figure 5A:
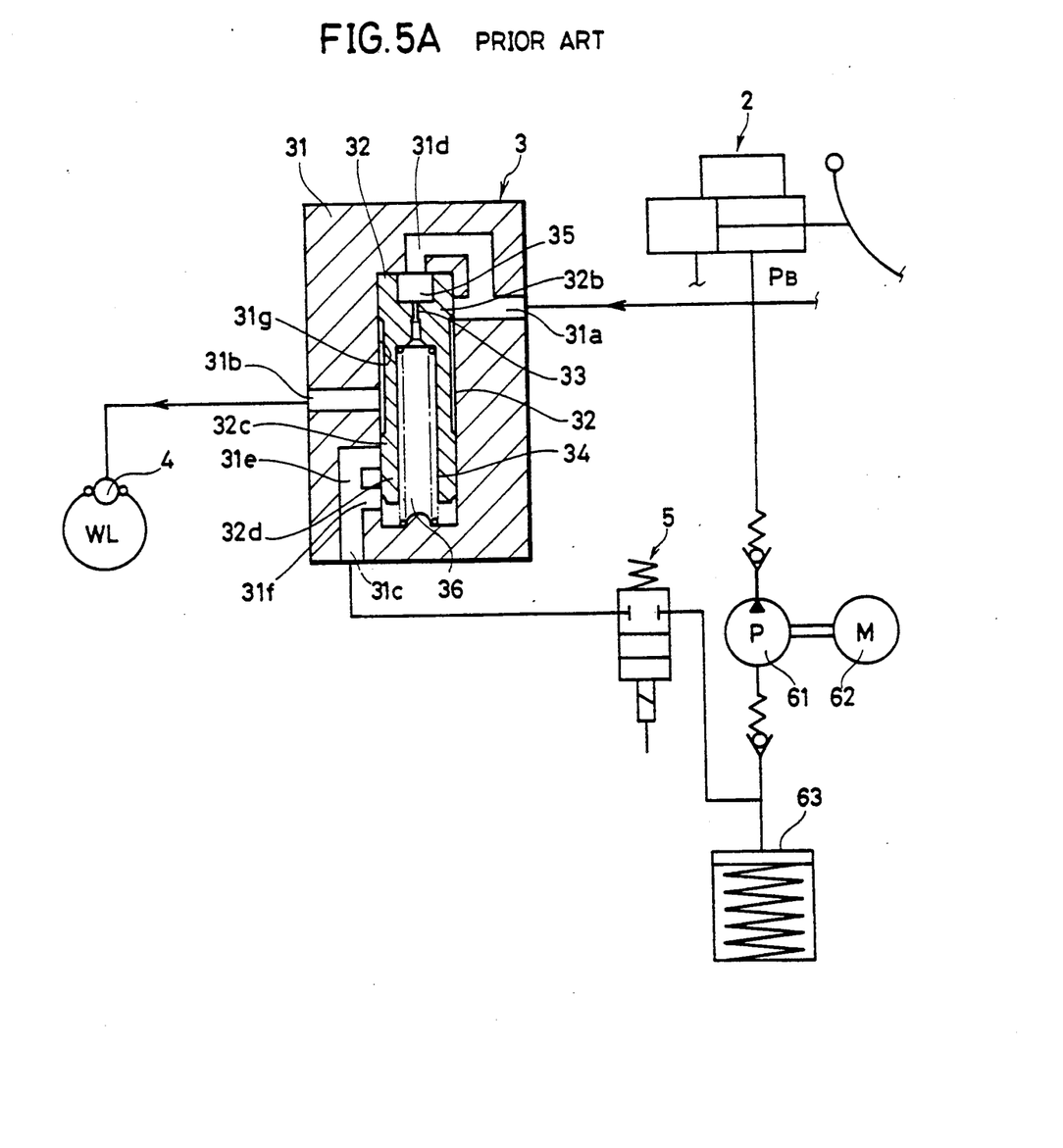
FIG. 5A is a sectional view showing the flow control valve in a normal braking operation.
Figure 5B:
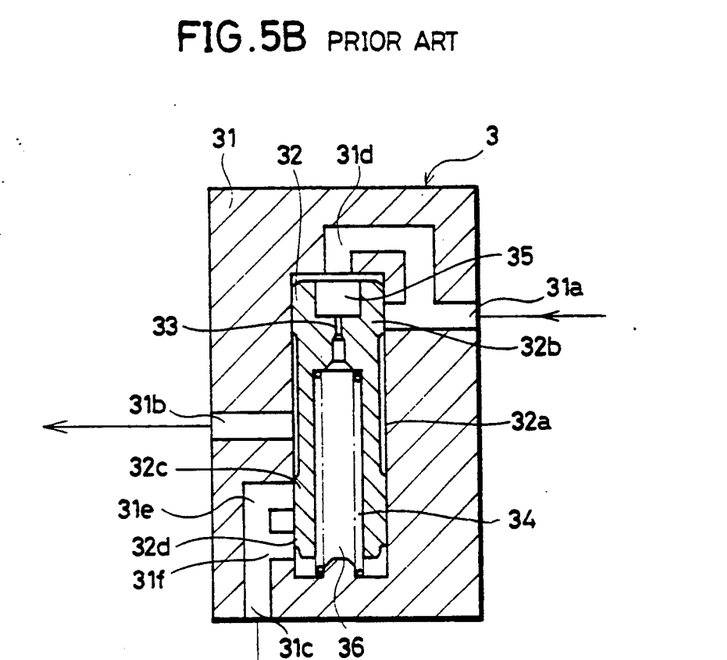
FIG. 5B is a sectional view showing a state of a spool slightly moving toward a pressure reducing chamber.
Figure 5C:
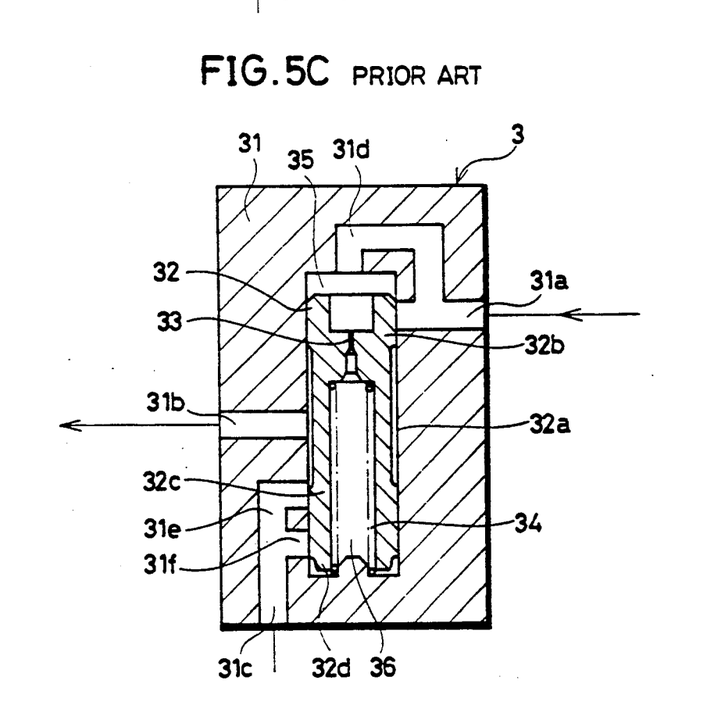
FIG. 5C is a sectional view showing a state of the spool further moving toward the pressure reducing chamber.

FIGS. 5A, 5B and 5C illustrate a flow control valve 3 which is disclosed in U.S. Pat. No. 4,715,666. The flow control valve 3 comprises a frame 31 which has an inlet port 31a connected to a master cylinder 2, an outlet port 31b connected to a wheel brake 4, and an exhaust port 31c connected to an electromagnetic valve 5, which is a two-port two-position control valve. The frame 31 has a cylindrical bore 31g in its interior. This cylindrical bore 31g defines a pressure chamber 35 which is connected to the inlet port 31a on its first end and a pressure reducing chamber 36 which is connected to the outlet port 31b and the exhaust port 31c on its second end. A spool 32 and a spring 34 are contained in the cylindrical bore 31g of the frame 31. The spool 32 has a fluid passage, which extends through the same to connect both ends thereof and defines an orifice 33 in an intermediate position. A first end of the spool 32 is faced with the pressure chamber 35, while its second end is faced with the pressure reducing chamber 36. The spool 32 is so slidable in the cylindrical bore 31g as to switch communications between the ports. The spring 34 urges the spool 32 toward the pressure chamber 35.

When no antilocking control is performed, the flow control valve 3 is in the state shown in FIG. 5A. In this state, a large passage is defined to connect the inlet port 31, an outer peripheral groove portion 32a of the spool 32 and the outlet port 31b.

During pressure reduction for the antilocking control, power is supplied to the electromagnetic valve 5 to open the same. Then, working fluid stored in the pressure reducing chamber 36 is exhausted through the exhaust port 31c to a reservoir 63. Consequently, differential pressure is developed across the spool 32, whereby the spool 32 moves toward the pressure reducing chamber 36 and enters a state shown in FIG. 5B. In the state shown in FIG. 5B, an edge 32b of the spool 32 closes the aforementioned large passage. The spool 32 further moves toward the pressure reducing chamber 36 from the state shown in FIG. 5B, to enter a state shown in FIG. 5C. In the state shown in FIG. 5C, another edge 32c of the spool 32 opens an exhaust passage connecting the outlet port 31b, the outer peripheral groove portion 32a of the spool 32, a passage 31e and the exhaust port 31b. Working fluid applying pressure to the wheel brake 4 is exhausted to the reservoir 63 through the aforementioned exhaust passage and the electromagnetic valve 5. Thus, fluid pressure for the wheel brake 4 is reduced. The working fluid stored in the reservoir 63 is absorbed and pressurized by a pump 61, which is driven by a motor 62, to be fed back between the master cylinder 2 and the inlet port 31a.

When no power is supplied to the electromagnetic valve 5 in re-pressurization for antilocking control, a variable orifice is defined by an edge portion 32d of the spool 32 and the inner peripheral end of a passage 31f in the state shown in FIG. 5C to define a small passage connecting the inlet port 31a, a passage 31d, the pressure chamber 35, the orifice 33, the pressure reducing chamber 36, the passages 31f and 31e, the outer peripheral groove portion 32a of the spool 32, and the outlet port 31b, thereby loosely increasing the fluid pressure for the wheel brake 4. When differential pressure across the inlet and outlet ports 31a and 31b is reduced, the spool 32 returns to its original position, to attain the state shown in FIG. 5A.

The antilocking device shown in FIG. 5A has a cast advantage since only one electromagnetic valve is required for each wheel. During the re-pressurization for an antilocking control in the state shown in FIG. 5C, the degree of opening of the variable orifice defined by the edge portion 32d of the spool 32 and the inner peripheral end of the passage 31f, is automatically adjusted so that a differential pressure developed across the fixed orifice 33 by a flow of the fluid passing through the fixed orifice 33, is balanced by pressure which is determined by the effective sectional area of the spool 32 and by the urging force of the spring 34. Therefore, the flow rate of the working fluid during re-pressurization is constant regardless of the value of the differential pressure across the inlet port 31a and the outlet port 31b. Further, since the differential pressure across the fixed orifice 33 can be reduced, it is possible to ensure a small flow rate even if the fixed orifice 33 has a relatively large diameter, whereby the antilocking device can be easily applied to a small vehicle having a small brake with a small fluid consumption.

However, the flow control valve disclosed in U.S. Pat. No. 4,715,666 has the following problems:

In the flow control valve shown in FIG. 5A, a small passage closing member is provided in the passage connecting the pressure reducing chamber 36 with the outlet port 31b. This small passage closing member is defined by the edge 32c of the spool 32 and the wall surface of the cylindrical bore 31g. In the flow control valve having such a structure, the small passage connecting the pressure reducing chamber 36 with the outlet port 31b must be opened after the large passage connecting the inlet port 31a with the outlet port 31b is closed for a pressure reduction for an antilocking control. If the small passage connecting the pressure reducing chamber 36 with the outlet port 31b is opened before the large passage connecting the inlet port 31a with the outlet port 31b is closed, the working fluid introduced into the inlet port 31a is guided to the pressure reducing chamber 36 through the large passage by way of the small passage closing member. Thus, no differential pressure is developed across the spool 32, which enters a stationary state to achieve no pressure reduction. In the flow control valve 3 shown in FIG. 5A, therefore, it is necessary to open the small passage connecting the pressure reducing chamber 36 with the outlet port 31b after the large passage connecting the inlet port 31a with the outlet port 31b is closed.

The frame 31 and the spool 32 must be operated for implementing the aforementioned desired operation. In this case, the frame 31 and the spool 32 are to be operated in consideration of dimensional manufacturing errors. Such an operation causes the small passage connecting the pressure reducing chamber 36 with the outlet port 31b to be closed at the same time when the large passage connecting the inlet port 31a with the outlet port 31b is closed, as shown in FIG. 5B. If the spool 32 is fixed in a stationary state by contamination of foreign matters, for example, all passages connecting the inlet port 31a with the outlet port 31b are closed. Such a state is not desired in view of safety considerations since no pressure can be applied to the wheel brake 4.

Further, the flow control valve shown in FIG. 5A requires the small passage closing member defined by the edge 32c of the spool 32 and the wall surface of the cylindrical bore 31g, for closing the small passage connecting the pressure reducing chamber 36 with the outlet port 31b. Thus, the passages defined in the frame 31 are complicated in structure, whereby costs are increased. For example, the flow control valve 3 shown in FIG. 5A requires the passages 31e and 31f.

SUMMARY OF THE INVENTION

Accordingly, it is an object of the present invention to provide a flow control valve which can apply pressure to a wheel brake even if its spool should unexpectedly be fixed in a stationary state.

A flow control valve for an antilocking device of a vehicle braking system according to the present invention comprises the following features in combination a frame or housing, a spool and a spring in said housing. The housing has an inlet port which is connected to a pressure source, an outlet port which is connected to a wheel brake, an exhaust port which is connected to a normally closed exhaust passage, and a cylindrical bore which defines a pressure chamber connected to the inlet port at its first bore end and a pressure reducing chamber connected to the outlet port and the exhaust port at its second bore end. The spool is provided with a fluid passage which extends through the to interconnect both spool ends while defining a first fixed orifice in an intermediate spool position. The spool is slidably contained in the cylindrical bore to face with the first spool end said pressure chamber and with the second spool and the pressure reducing chamber for switching fluid communications between the respective ports by movement of the spool. The spring urges the spool toward the pressure chamber. When no antilocking control is performed, the spool is displaced toward the pressure chamber, thereby opening a large passage connecting the inlet port with the outlet port. The pressure reduction required for an antilocking control is accomplished by opening the normally closed exhaust passage. For this purpose the spool is displaced toward the pressure reducing chamber against the urging force of the spring, thereby closing the large passage connecting the inlet port with the outlet port and opening the passage connecting the outlet port with the exhaust port. The re-pressurization required for an antilocking control is accomplished by closing the exhaust passage. For this purpose a small passage is defined to connect the inlet port, the pressure chamber, the first fixed orifice, the pressure reducing chamber and the outlet port while a variable orifice is defined in an intermediate position of the small passage by the spool and the housing. The passage area of the variable orifice is automatically adjusted so that a differential pressure between the fluid pressure of the pressure chamber and that of the pressure reducing chamber bounded by the first fixed orifice assumes a constant value. The combination of the invention further comprises a second fixed orifice positioned in an intermediate located in a passage connecting the pressure reducing chamber with the outlet port the conventional valve of a throttling effect of the second fixed orifice exceeds the aforementioned constant value.

According to the present invention, the small passage closing member provided in the conventional flow control valve is not used and the pressure reducing chamber is regularly connected with the outlet port through the passage by way of the second fixed orifice, whereby the inlet port is regularly connected with the outlet port through the small passage. Therefore, even if the spool is fixed in a position closing the large passage, working fluid introduced from the inlet port flows to the outlet port through the small passage. Thus, it is possible to apply pressure to the wheel brake.

The inventive flow control valve according to the invention does not have a small passage closing member as shown in the conventional valve of FIG. 5A, whereby the passages defined in the frame can be simplified in structure to reduce costs and to attain a high reliability.

According to the present invention, the second fixed orifice is set to have an orifice or throttling effect which is higher than the constant pressure determined by the urging force of the spring for applying pressure to the spool and the effective diameter of the spool. Therefore, even if the working fluid is supplied from the inlet port to the pressure reducing chamber through the large passage and through the second fixed orifice when in starting the pressure reduction for an antilocking control, the spool can normally move to close the large passage since the aforementioned differential pressure exceeding the constant value is developed across the spool.

These and other objects, features, aspects and advantages of the present invention will become more apparent from the following detailed description of the present invention when taken in conjunction with the accompanying drawings.

BRIEF DESCRIPTION OF THE DRAWINGS

FIGS. 1A to 1D illustrate a first embodiment of the present invention, in which

FIGS. 2A to 2D illustrate another embodiment of the present invention, in which

FIGS. 3A to 3E illustrate still another embodiment of the present invention, in which

FIGS. 4A to 4D illustrate a further embodiment of the present invention, in which FIGS. 5A to 5C illustrate a conventional flow control valve, in which

DETAILED DESCRIPTION OF THE PREFERRED EMBODIMENTS

Figure 1A:
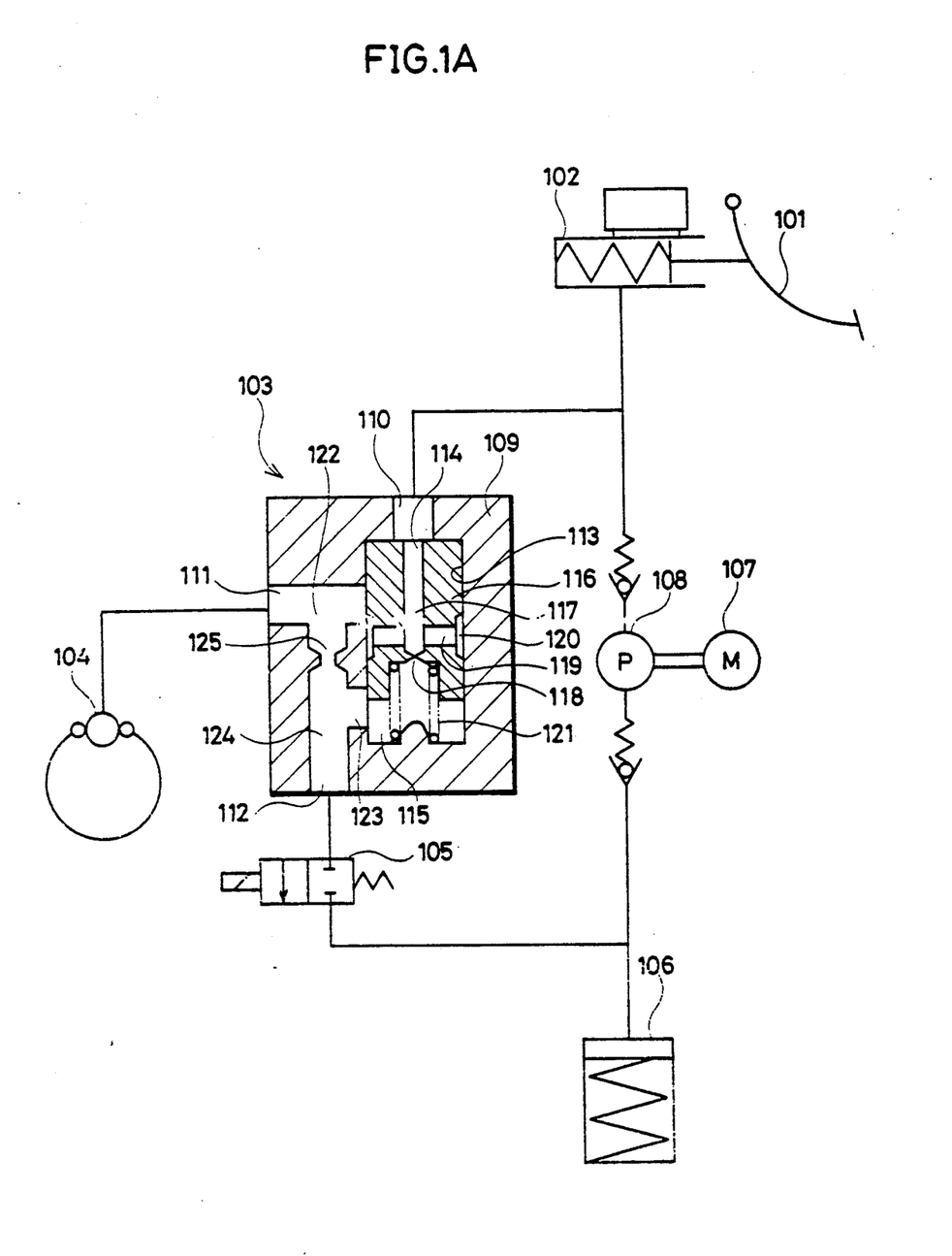
FIG. 1A is a sectional view showing a flow control valve in a normal braking operation.

Referring to FIG. 1A, a master cylinder 102 for generating pressure in proportion to the pedal force of a brake pedal 101 delivers working fluid, which is caused to flow to a wheel brake 104 through a flow control valve 103. The working fluid exhausted from the flow control valve 103 flows to a reservoir 106 through an exhaust valve 105. A pump 108 which is driven by a motor 107 sucks the working fluid from the reservoir 106 and pressurizes the same to deliver the working fluid to a passage which connects the master cylinder 102 with the flow control valve 103. The exhaust valve 105 is a two-port two-position control valve which is switched or operated by an electromagnetic force, and cuts off the passage when no power is supplied thereto. The exhaust valve 105 opens the passage in response to a power supply.

The flow control valve 103 comprises a frame or housing 109, a spool 116 and a spring 121. The housing 109 has an inlet port 110 which is connected to a pressure source, an outlet port 111 which is connected to the wheel brake 104, an exhaust port 112 which is connected to a normally closed exhaust passage, and a cylindrical bore 113. A first end 114 of the cylindrical bore 113 defines a pressure chamber which is connected to the inlet port 110, while second end 115 of the bore 113 defines a pressure reducing chamber which is connected to the outlet port 111 and the exhaust port 112.

The housing 109 is provided according to the invention with a second fixed orifice 125 in an intermediate position of passages 123, 124 and 122 connecting the pressure reducing chamber 115 with the outlet port 111. The second fixed orifice 125 is so set that its throttling effect exceeds a constant value, as hereinabove described.

The spool 116 is slidably contained in the cylindrical bore 113 of the housing 109. A fluid passage 117, extends through the spool 116 to connect both ends thereof with each other. A first fixed orifice 118 is formed in an intermediate position of the fluid passage 117. The spool 116 further has a passage 119 and an outer peripheral groove portion 120. The spool 116 moves in the cylindrical bore 113, to switch communications between the ports.

The spring 121 urges the spool 116 toward the pressure chamber 114.

The operation of the flow control valve 103 will now be described.

During a normal braking operation, the flow control valve 103 is in the state shown in FIG. 1A. In this state, a large passage connects the inlet port 110, the pressure chamber 114, the fluid passage 117, the passage 119, the outer peripheral groove portion 120, the passage 122, and the outlet port 111.

During a pressure reduction for an antilocking control, power is supplied to the exhaust valve 105, which in turn opens the passage. Thus, working fluid stored in the pressure reducing chamber 115 flows to the reservoir 106 through the passages 123 and 124 and the exhaust port 112. When a pressure reducing operation is started, the working fluid introduced into the inlet port 110 may flow into the pressure reducing chamber 115 through the aforementioned large passage through the second fixed orifice 125 and through the passages 124 and 123. In this case, a differential pressure is developed across the second fixed orifice 125 since the working fluid passes through the second fixed orifice 125, whereby the spool 116 moves toward the pressure reducing chamber 115 without being stopped. In order to implement this operation, the throttling effect of the second fixed orifice 125 is set to exceed the constant value, which is determined by the urging force of the spring 121 and the effective sectional area of the spool 116.

Figure 1B:
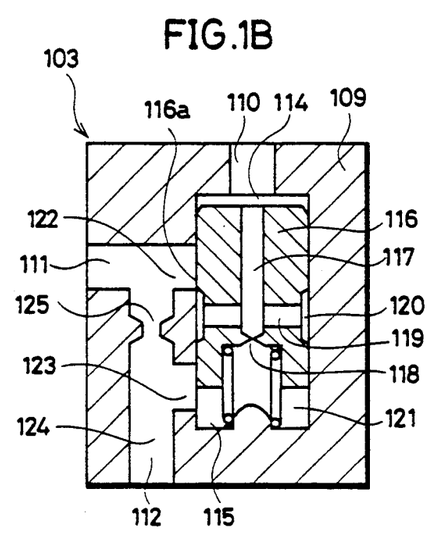
FIG. 1B is a sectional view showing a state of a spool slightly moving toward a pressure reducing chamber.

FIG. 1B shows a state of the spool 116 slightly moved toward the pressure reducing chamber 115 from the state shown in FIG. 1A, whereby edge portion 116a of the spool 116 closes the aforementioned large passage.

Figure 1C:
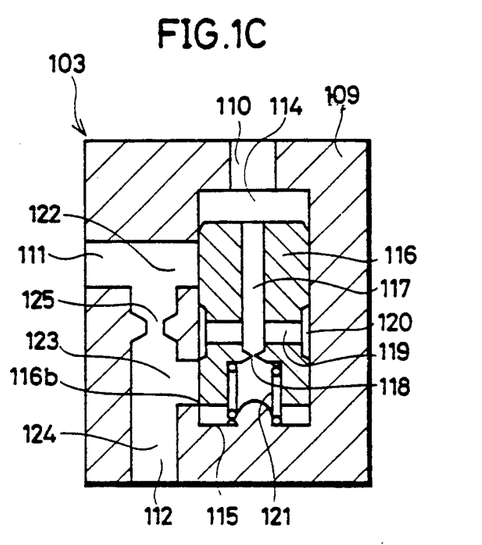
FIG. 1C is a sectional view showing a state of the spool further moving toward the pressure reducing chamber.

FIG. 1C shows a state of the spool 116 further moved toward the pressure reducing chamber 115 from the state shown in FIG. 1B, whereby a variable orifice is defined by another edge portion 116b of the spool 116 and the inner peripheral end of the passage 123. In the state shown in FIG. 1C, further, the aforementioned large passage is closed but a small passage connects the inlet port 110, the pressure chamber 114, the fluid passage 117, the first fixed orifice 118, the pressure reducing chamber 115, the variable orifice, the passages 123 and 124, and the exhaust port 112. The working fluid passes through the first fixed orifice 118, to produce a differential pressure across the first fixed orifice 118. The degree of opening of the variable orifice is automatically adjusted to balance the differential pressure across the first fixed orifice 118 with the pressure which is determined by the effective sectional area of the spool 116 and the urging force of the spring 121. Namely, the degree of opening of the variable orifice is reduced when pressure difference between the inlet port 110 and the passage 123 is large, while the degree of opening is increased when the pressure difference between the inlet port 110 and the passage 123 is small.

After the large passage connecting the inlet port 110 with the outlet port 111 is closed as shown in FIG. 1C, the working fluid acting on the wheel brake 104 is exhausted to the exhaust passage which is connected to the reservoir 106 through the outlet port 111, the second fixed orifice 125, the passage 124 and the exhaust port 112. Consequently, the fluid pressure for the wheel brake 104 is reduced.

During a pressure application for an antilocking control, no power is supplied to the exhaust valve 105. The exhaust port 105 closes the passage, whereby the exhaust of the working fluid acting on the wheel brake 104 is stopped. However, the spool 116 remains in the position shown in FIG. 1C since the pressure of the outlet port 111 is smaller than that of the inlet port 110. In this case, the working fluid introduced into the inlet port 110 is guided to the wheel brake 104 through the pressure chamber 114, the fluid passage 117, the first fixed orifice 118, the pressure reducing chamber 115, the variable orifice, the passages 123 and 124, the second fixed orifice 125, and the outlet port 111. Thus, the fluid pressure for the wheel brake 104 can be increased at a small rate of pressure application.

When the differential pressure across the inlet port 110 and the passage 123 is reduced and the pressure determined by the urging force of the spring 121 and the effective sectional area of the spool 116 is reduced below a constant value, the spool 116 moves toward the pressure chamber 114 by the urging force of the spring 121, to finally return to the state shown in FIG. 1A. As hereinabove described, the large passage connecting the inlet port 110 with the outlet port 111 is opened in the state shown in FIG. 1A.

Figure 1D:
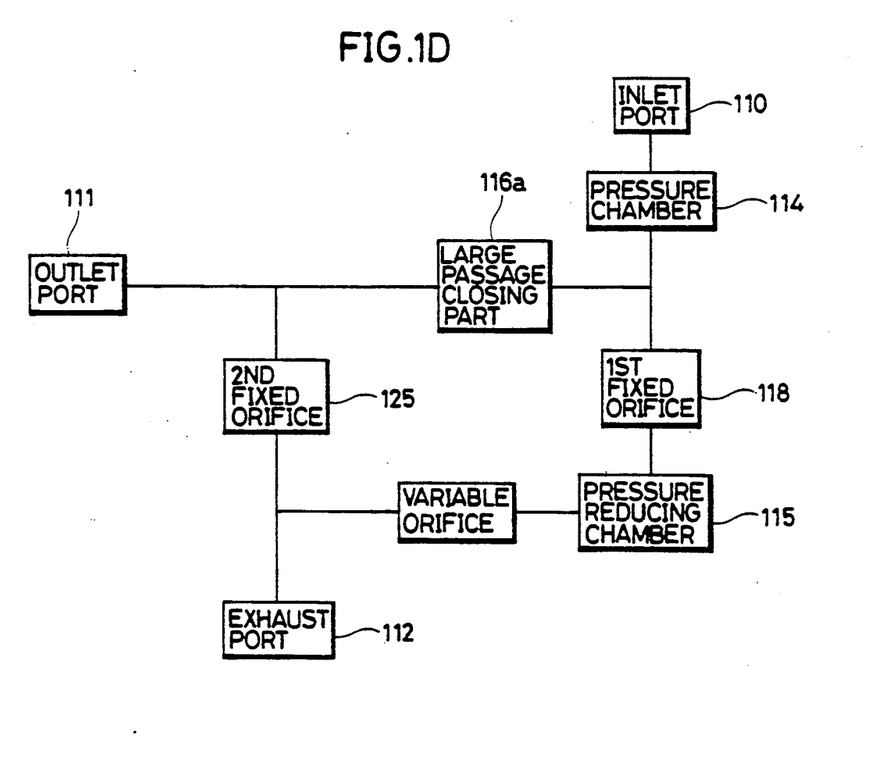
FIG. 1D is a block diagram showing the flow system of working, fluid in this embodiment.

FIG. 1D is a block diagram showing the flow system of the working fluid in the embodiment shown in FIG. 1A.

FIGS. 2A, 2B, 2C and 2D illustrate another embodiment of the present invention. A flow control valve 201 comprises a housing 202, a spool 212 and a spring 219. The housing 202 has an inlet port 203, an outlet port 204, an exhaust port 205, passages 206, 207, 208, 209 and 210, a second fixed orifice 211, and a cylindrical bore 213. A first end of the cylindrical bore 113 defines a pressure chamber 214, while the second end of the bore 113 defines a pressure reducing chamber 215.

Figure 2A:
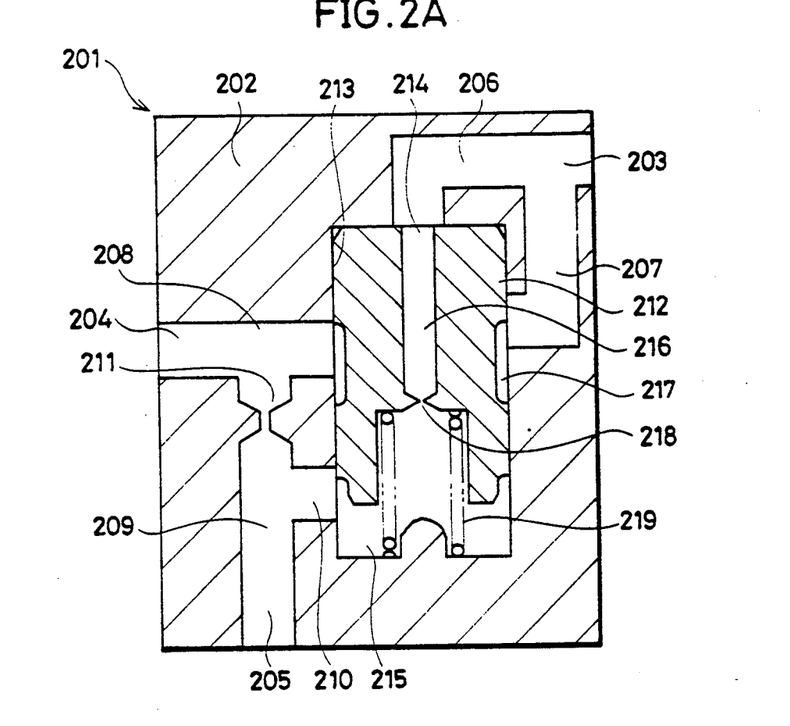
FIG. 2A is a sectional view showing a flow control valve in a normal braking operation.

The spool 212 has a fluid passage 216 and a first fixed orifice 218 formed in its interior and an outer peripheral groove portion 217 formed in its outer peripheral surface. The spring 219 urges the spool 212 toward the pressure chamber 214.

In a normal braking operation, the flow control valve 201 is in the state shown in FIG. 2A. In this state, a large passage is defined to connect the inlet port 203, the passage 207, the outer peripheral groove portion 217, the passage 208 and the outlet port 204.

Figure 2B:
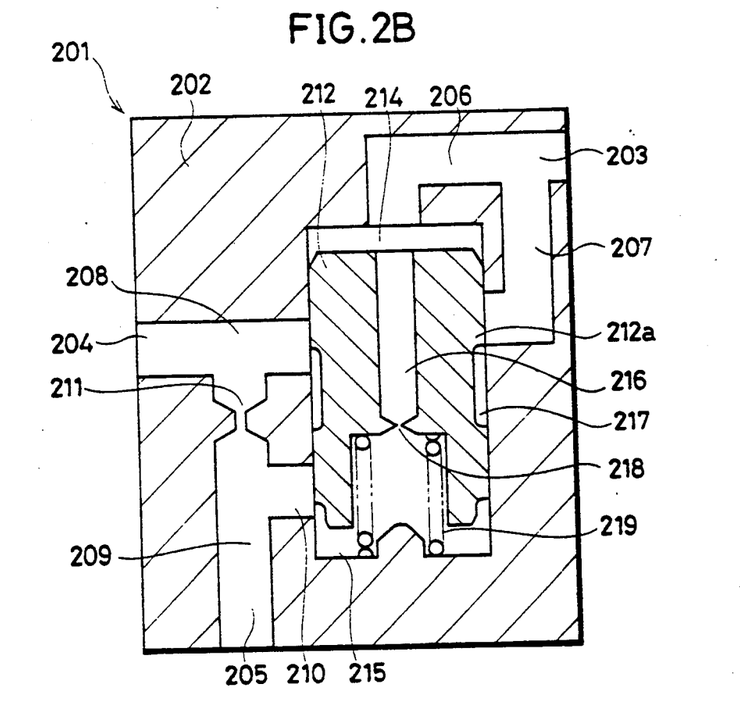
FIG. 2B is a sectional view showing a state of a spool slightly moving toward a pressure reducing chamber.

During a pressure reduction for an antilocking control, the spool 212 moves toward the pressure reducing chamber 215. FIG. 2B shows a state of the spool 212 slightly moved toward the pressure reducing chamber 215 from the state shown in FIG. 2A. In the state shown in FIG. 2B, an edge portion 212a of the spool 212 closes the large passage connecting the inlet port 203 with the outlet port 204.

Figure 2C:
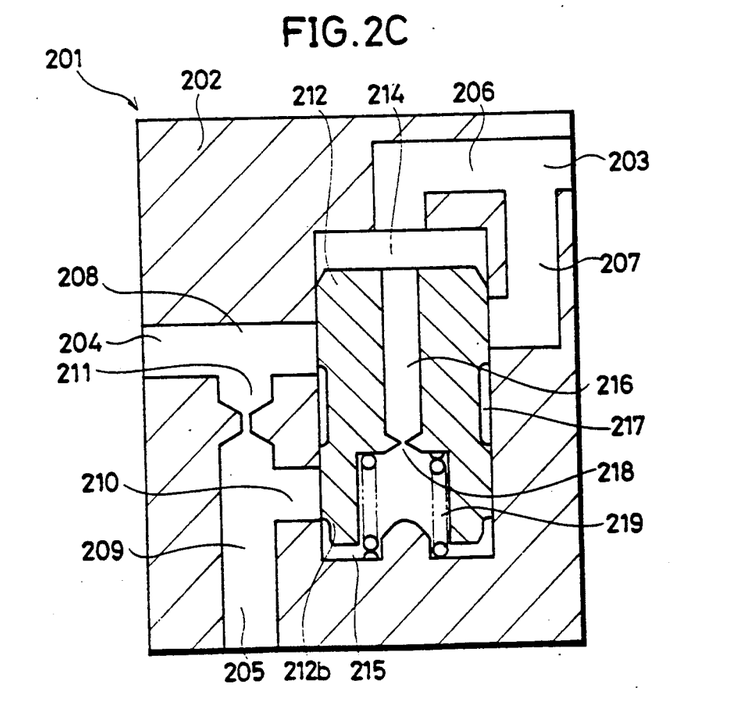
FIG. 2C is a sectional view showing a state of the spool further moving toward the pressure reducing chamber.

FIG. 2C shows a state of the spool 212 further moved toward the pressure reducing chamber 215 from the state shown in FIG. 2B. In the state shown in FIG. 2C, a variable orifice is defined by another edge portion 212b of the spool 212 and the inner peripheral end of the passage 210. Similarly to the aforementioned embodiment, the degree of opening of this variable orifice is automatically adjusted.

During a pressure application for an antilocking control, flow-controlled working fluid flows to a wheel brake through a small passage connecting the inlet port 203, the passage 206, the pressure chamber 214, the fluid passage 216, the first fixed orifice 218, the pressure reducing chamber 215, the variable orifice, the passages 210 and 209, the second fixed orifice 211, the passage 208, and the outlet port 204.

Figure 2D:
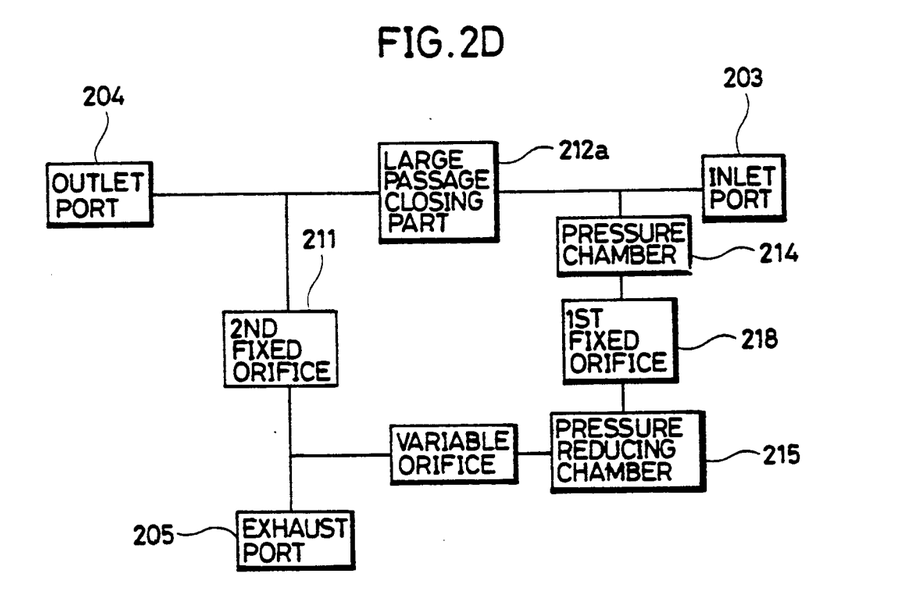
FIG. 2D is a block diagram showing a flow system of working fluid in this embodiment.

FIG. 2D is a block diagram showing the flow system of the working fluid in the embodiment shown in FIG. 2A. This system is different from that shown in FIG. 1D in that the large passage leading from the inlet port 203 branches into two passages, which lead into the large passage closing part 212a and the pressure chamber 214 respectively. In the embodiment shown in FIG. 1D, on the other hand, the passage connecting the pressure chamber 114 with the fixed orifice 118 branches to lead to the large passage closing part 116a.

Figure 3A:
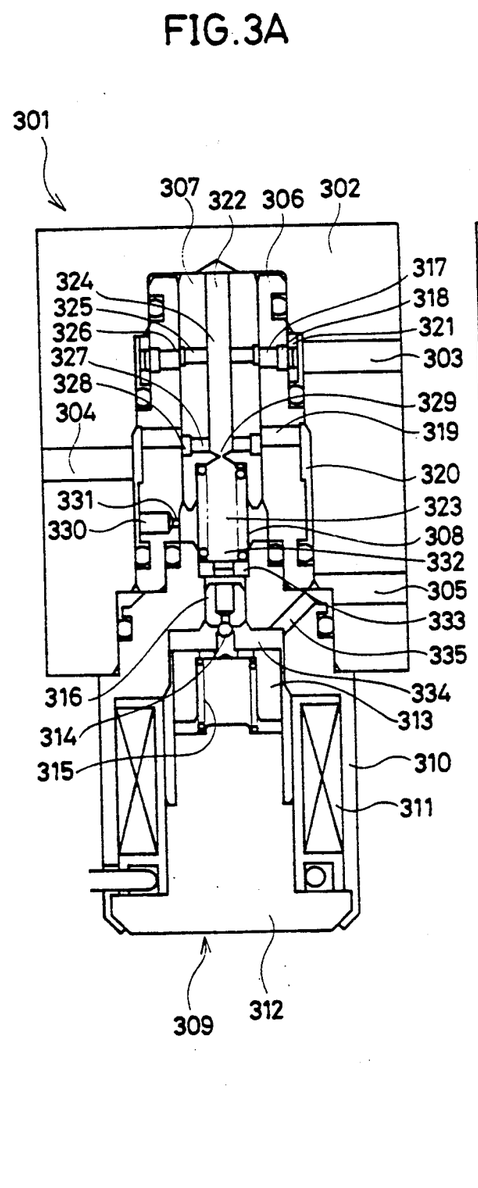
FIG. 3A is a sectional view showing a flow control valve in a normal braking operation.

FIGS. 3A, 3B, 3C, 3D and 3E illustrate still another embodiment of the present invention. Referring to FIG. 3A, a flow control valve 301 comprises a housing 302, an electromagnetic valve 309 which is integrated into the housing 302, a sleeve 306, a spool 307, and a spring 308. The housing 302 has an opening end so that the electromagnetic valve 309 is integrated into this opening end. As shown in FIG. 3A, the housing 302 has an inlet port 303 which is connected to a pressure source, an outlet port 304 which is connected to a wheel brake, and an exhaust port 305 which is connected to an exhaust passage.

The sleeve 306, which is adapted to simplify the manufacturing of the flow control valve 301, is secured in the housing 302. This sleeve 306 has a passage 317, an outer peripheral groove portion 318, another passage 319, another outer peripheral groove portion 320, still another passage 330, and a second fixed orifice 331. A filter 321 is disposed between the sleeve 306 and the inlet port 303 of the frame 302.

The spool 307 is slidably contained in the sleeve 306. A passage 324 extends through the spool 307 to connect both spool ends with each other. The spool 307 further has a first fixed orifice 329 provided in an intermediate position of the passage 324, another passage 325, an outer peripheral groove portion 326, still another passage 327, and another outer peripheral groove portion 328.

The electromagnetic valve 309 has a yoke 310 which is fixed to or mounted on the housing 302, a coil 311, a stator 312, an armature 313, valve ball 314, a spring 315, and a valve seat 316 which is fixed to or mounted on the yoke 310. The valve ball 314 is movable in a valve chamber 334 with the armature 313. The spring 315 urges the valve ball 314 to open the same. A passage 335 is provided in the yoke 310.

The sleeve 306 has a cylindrical bore which slidably receives the spool 307. A first end of this cylindrical bore defines a pressure chamber 322 while its second end defines a pressure reducing chamber 323. An exhaust port 322 is formed between the pressure reducing chamber 323 and the valve seat 332. The spring 308 urges the spool 307 toward the pressure chamber 322.

In a normal braking operation, the spool 307 is in the state shown in FIG. 3A. In this state, a large passage interconnects the inlet port 303, the filter 321, the outer peripheral groove portion 318, the passage 317, the outer peripheral groove portion 326, the passages 325, 324 and 327, the outer peripheral groove portion 328, the passage 319, the outer peripheral groove portion 320, and the outlet port 304.

During a pressure reduction for an antilocking control, power is supplied to the coil 311 of the electromagnetic valve 309. Then, the armature 313 is attracted toward the stator 312 against the force of the spring 315. The valve ball 314 which is fixed to the armature 313 moves toward the stator 312 with the armature 313, to separate from the valve seat 316. Consequently, working fluid stored in the pressure reducing chamber 323 is exhausted from the exhaust port 305 through the exhaust port 332, the filter 333, the valve seat 316, the valve chest 334 and the passage 335. In this state, working fluid introduced into the inlet port 303 is supplied to the pressure reducing chamber 323 through the aforementioned large passage by way of the passage 330 of the sleeve 306 and the second fixed orifice 331. Differential pressure is developed across the second fixed orifice 331 by such flow of the working fluid. The differential pressure required for movement of the spool 307 is determined by the force of the spring 308 and the effective sectional area of the spool 307. The throttling effect of the second fixed orifice 331 is so set that the differential pressure developed across the same is larger than the differential pressure required for movement of the spool 307. Thus, the spool 307 moves toward the pressure reducing chamber 323 against the force of the spring 308, to enter a state shown in FIG. 3B.

Figure 3B:
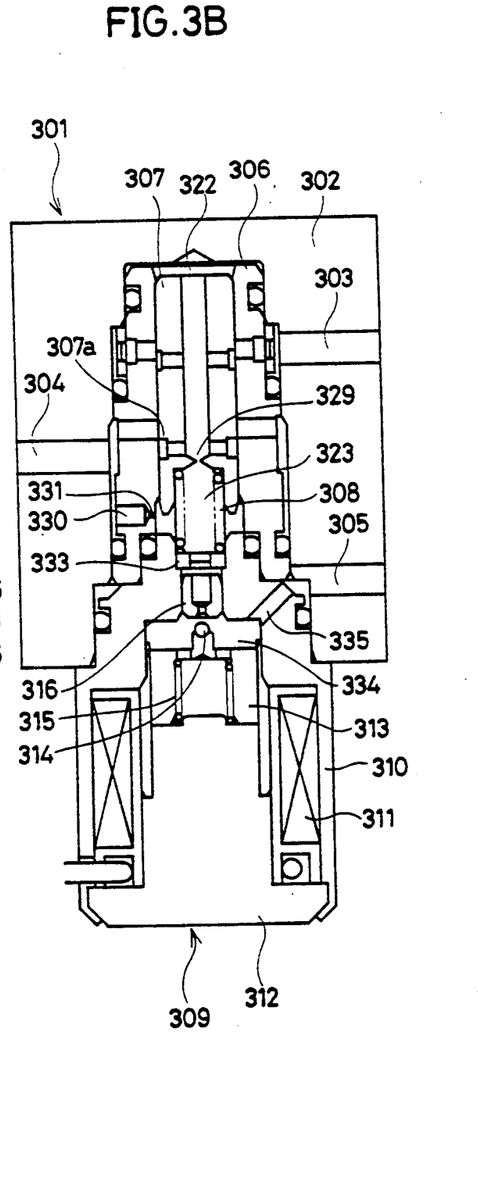
FIG. 3B is a sectional view showing a state of a spool slightly moving toward a pressure reducing chamber.

In the state shown in FIG. 3B, an edge portion 307a of the spool 307 closes the large passage connecting the inlet port 303 with the outlet port 304.

Figure 3C:
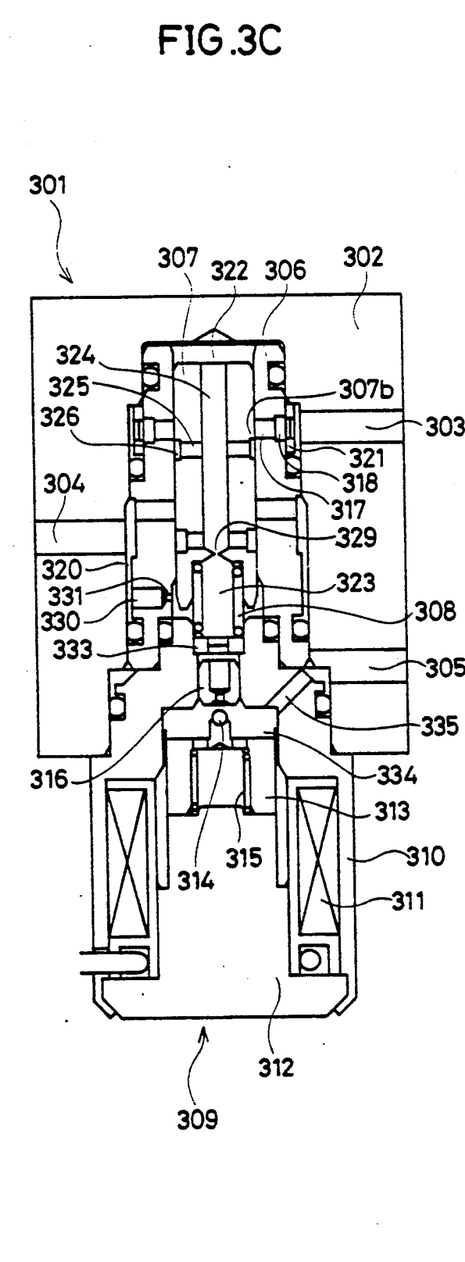
FIG. 3C is a sectional view showing a state of the spool further moving toward the pressure reducing chamber.

FIG. 3C shows a state of the spool 307 further moved toward the pressure reducing chamber 323 from the state shown in FIG. 3B. In the state shown in FIG. 3C, a variable orifice is defined by another edge portion 307b of the spool 307 and by the inner peripheral end of the passage 317 of the sleeve 306. Therefore, a fluid flow occurs in the passage connecting the inlet port 303, the filter 321, the outer peripheral groove portion 318, the passage 317, the outer peripheral groove portion 326, the passages 325 and 324, the first fixed orifice 329 and the pressure reducing chamber 323. Differential pressure is developed across the first fixed orifice 329 by this fluid current. The degree of opening of the variable orifice defined by the edge portion 307b of the spool 307 and the inner peripheral end of the passage 317 of the sleeve 306 is automatically adjusted to balance the differential pressure developed across the first fixed orifice 329 with the force of the spring 308. Both, the flow-controlled working fluid and the working fluid flowing from the wheel brake into the pressure reducing chamber 323 through the outlet port 304, the outer peripheral groove portion 320, the passage 330 and the second fixed orifice 331 are exhausted from the exhaust port 305 through the electromagnetic valve 309.

Figure 3D:
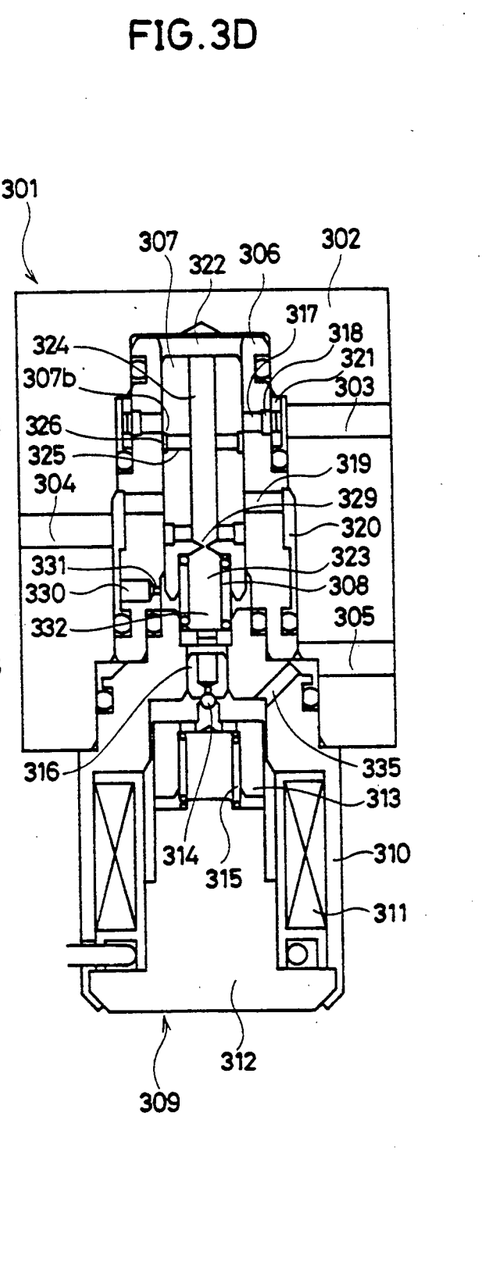
FIG. 3D is a sectional view showing a closed state of an electromagnetic valve shown in FIG. 3C.

During a pressure application for an antilocking control, the power supply to the coil 311 of the electromagnetic valve 309 is switched off. Consequently, the ball valve 314 comes into contact with the valve seat 316 by the force of the spring 315 as shown in FIG. 3D, to close the passage, whereby the exhaust through the exhaust port 305 is stopped. In the state shown in FIG. 3D, a small passage connects the inlet port 303, the filter 321, the outer peripheral groove portion 318, the passage 317, the variable orifice, the outer peripheral groove portion 326, the passages 325 and 324, the first fixed orifice 329, the pressure reducing chamber 323, the second fixed orifice 331, the passage 330, the outer peripheral groove portion 320, and the outlet port 304. The flow rate of the working fluid passing through this small passage is constantly adjusted without any regard to the differential pressure between the inlet port 303 and the outlet port 304, similarly to the above described embodiments. Thus, the fluid pressure for the wheel brake can be increased at a small rate of pressure application.

Figure 3E:
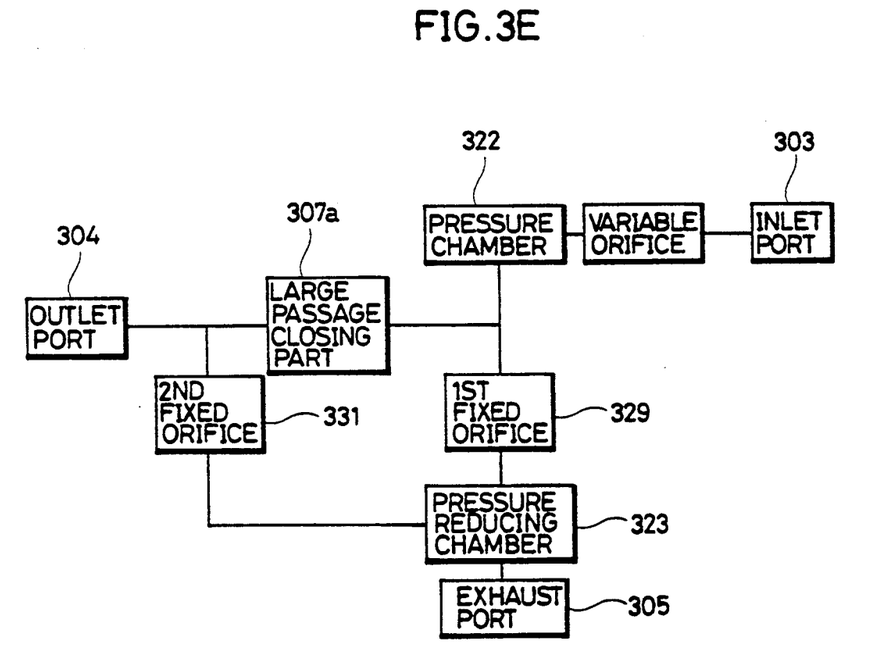
FIG. 3E is a block diagram showing a flow system of working fluid in this, embodiment.

FIG. 3E is a block diagram showing the flow system of the working fluid in the embodiment shown in FIG. 3A. In this embodiment, the variable orifice is provided between the inlet port 303 and the pressure chamber 322 while the large passage branches in a portion between the pressure chamber 322 and the first fixed orifice 329, dissimilarly to the above embodiments.

FIGS. 4A, 4B, 4C and 4D illustrate a further embodiment of the present invention.

Figure 4A:
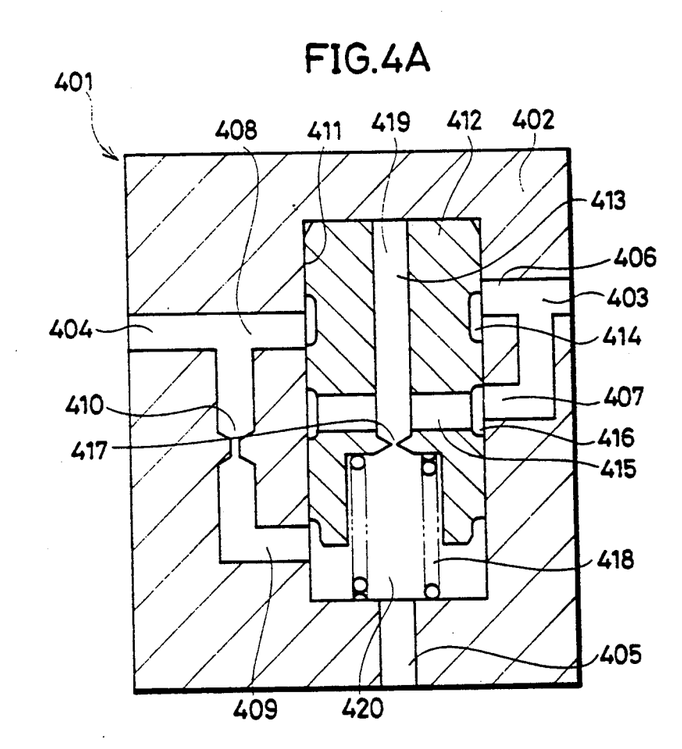
FIG. 4A is a sectional view showing a flow control valve in a normal braking operation.

Referring to FIG. 4A, a flow control valve 401 comprises a housing 402, a spool 412 and a spring 418.

The housing 402 has an inlet port 403 which is connected to a pressure source, an outlet port 404 which is connected to a wheel brake, an exhaust port 405 which is connected to an exhaust passage, passages 406, 407, 408 and 409, and a second fixed orifice 410. The housing 402 has a cylindrical bore 411 in its interior. A first end of the cylindrical bore 411 defines a pressure chamber 419, while its second end defines a pressure reducing chamber 420.

The spool 412 has a passage 419 which extends through both ends thereof, a first fixed orifice 417 which is provided in an intermediate position of this passage 419, a passage 415, and outer peripheral groove portions 414 and 416. The spring 418 urges the spool 412 toward the pressure chamber 419.

As shown in FIG. 4A, a large passage connects the inlet port 403, the passage 406, the outer peripheral groove portion 414, the passage 408, and the outlet port 404 in a normal braking operation.

Figure 4B:
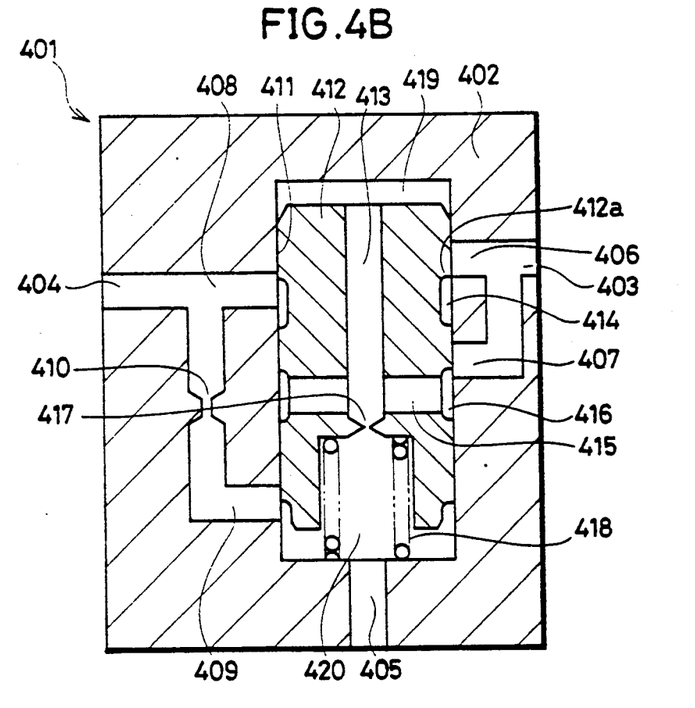
FIG. 4B is a sectional view showing a state of a spool slightly moving toward a pressure reducing chamber.

During a pressure reduction for an antilocking control, an edge portion 412a of the spool 412 closes the aforementioned large passage, as shown in FIG. 4B. Working fluid acting on the wheel brake is exhausted to the exhaust passage through the outlet port 404, the passage 408, the second fixed orifice 410, the passage 409, the pressure reducing chamber 420, and the exhaust port 405.

Figure 4C:
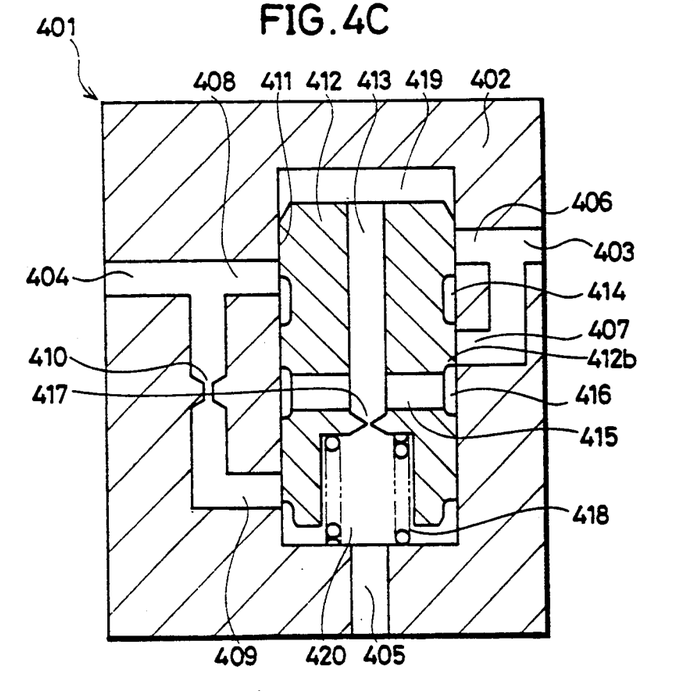
FIG. 4C is a sectional view showing a state of the spool further moving toward the pressure reducing chamber.

During a pressure application for an antilocking control, a variable orifice is defined by another edge portion 412b of the spool 412 and the inner peripheral end of the passage 407 of the housing 402, as shown in FIG. 4C. Working fluid introduced into the inlet port 403 flows into the outlet port 404 through the passage 407, the variable orifice, the outer peripheral groove portion 416, the passage 415, the first fixed orifice 417, the pressure reducing chamber 420, the passage 409, the second fixed orifice 410 and the passage 408. The flow rate of the working fluid passing through this small passage is constantly adjusted similarly to the above described embodiments.

Figure 4D:
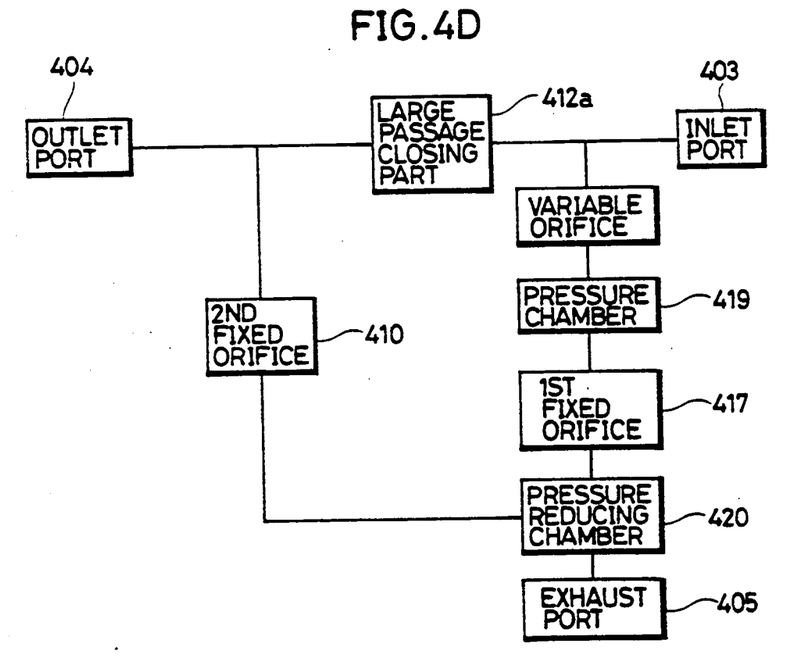
FIG. 4D is a block diagram showing a flow system of working fluid, in this embodiment.

FIG. 4D is a block diagram showing the flow system of the working fluid in the embodiment shown in FIG. 4A. In this embodiment, the passage reaching the large passage closing part of the spool 412 branches between the inlet port 403 and the variable orifice. The variable orifice is provided between the branch point and the pressure chamber 419, dissimilarly to the above embodiments.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A flow control valve for an antilocking device for a vehicle brake system, comprising in combination: a housing having an inlet port connected to a pressure source, an outlet port connected to a wheel brake, an exhaust port connected to a normally closed exhaust, a cylindrical bore in said housing defining a pressure chamber having a first end connected to said inlet port, said pressure chamber having a second end connected to a pressure reducing chamber connected to said outlet port and to said exhaust port; a spool having a spool passage extending entirely through said spool, a first fixed orifice in said spool passage, said spool being slidably held in said cylindrical bore so that one spool end faces said pressure chamber and an opposite spool end faces said pressure reducing chamber respectively, said spool switching communications between respective ports by a spool movement; a spring for urging said spool toward said pressure chamber, wherein said spool is displaced toward said pressure chamber to open a first passage normally connecting said inlet port with said outlet port in the absence of an antilocking control operation, wherein said spool is displaced toward said pressure reducing chamber against a force of said spring to close said first passage connecting said inlet port with said outlet port and to open a second passage connecting said outlet port with said exhaust port for producing a pressure reduction for an antilocking control by opening said normally closed exhaust, a third passage for interconnecting said inlet port, said pressure chamber, said first fixed orifice, said pressure reducing chamber, and said outlet port, a variable orifice defined by said spool and said housing in said third passage, said variable orifice having a variable flow area which is automatically adjusted so that a differential pressure between fluid pressure in said pressure chamber and fluid pressure in said pressure reducing chamber bounded by said first fixed orifice reaches a constant value during a re-pressurization for an antilocking control operation for closing said exhaust, and a second fixed orifice provided in said third passage between said pressure reducing chamber and said outlet port, said second fixed orifice having a throttling effect set to exceed said constant value of said differential pressure, whereby a braking action and a pressure reduction for an automatic antilocking control are positively enforced.

2. The flow control valve of claim 1, wherein said first, second, and third passages are formed by flow channel means passing through said inlet port and through said pressure chamber, said flow channel means branching into a first channel section leading to said outlet port and a second branching channel section leading to said exhaust port, said control valve further comprising means for closing said first branching channel section, wherein said first fixed orifice, said pressure reducing chamber, and said variable orifice are formed in said second branching channel section, and wherein said flow channel means comprise a third channel section wherein said second fixed orifice is formed for connecting said first branching channel section leading to said outlet port with said second branching channel section leading from said variable orifice to said exhaust port.

3. The flow control valve of claim 1, wherein said first, second, and third passages comprise flow channel means passing through said inlet port and branching into a first channel section leading to said outlet port and into a second channel section leading to said exhaust port, said control valve further comprising means for closing said first channel section, wherein said pressure chamber, said first fixed orifice, said pressure reducing chamber, and said variable orifice are formed in said second channel section, and wherein said flow channel means comprise a third channel section wherein said second fixed orifice is formed for connecting said first channel section leading to said outlet port with said second channel section leading to said exhaust port.

4. The flow control valve of claim 1, wherein said first, second, and third passages comprise flow channel means passing through said inlet port, through said variable orifice, and through said pressure chamber, said flow channel means branching into a first channel section leading to said outlet port and a second channel section leading to said exhaust port, said control valve further comprising means for closing said first channel section, wherein said second fixed orifice and said pressure reducing chamber are formed in said second channel section, and wherein said flow channel means comprise a third channel section wherein said second fixed orifice is formed, said third channel section connecting said pressure reducing chamber with said outlet port.

5. The flow control valve of claim 1, wherein said first, second, and third passages comprise flow channel means passing through said inlet port and branching into a first channel section leading into said outlet port and a second channel section leading into said exhaust port, said control valve further comprising means for closing said first channel section, wherein said variable orifice, said pressure chamber, said first fixed orifice, and said pressure reducing chamber are formed in said second channel section, and wherein said flow channel means comprise a third channel section, wherein said second fixed orifice is formed, said third channel section connecting said pressure reducing chamber with said outlet port.

* * * * *

UNITED STATES PATENT AND TRADEMARK OFFICE
CERTIFICATE OF CORRECTION

PATENT NO. : 5,094,512

DATED : March 10, 1992

INVENTOR(S) : Teruhisa Kohno; Koichi Hashida

It is certified that error appears in the above-identified patent and that said Letters Patent is hereby corrected as shown below:

Claim 1, column 12, line 12, replace "valve" by --value--.

Signed and Sealed this

Fourth Day of May, 1993

Attest:

MICHAEL K. KIRK

Attesting Officer      Acting Commissioner of Patents and Trademarks